United States Patent
Taylor et al.

(10) Patent No.: US 9,569,449 B2
(45) Date of Patent: Feb. 14, 2017

(54) METHOD AND APPARATUS FOR AUTONOMIC DISCOVERY OF SENSITIVE CONTENT

(75) Inventors: Daniel McKenzie Taylor, Mermaid Beach (AU); Peter Terence Cogill, Southport (AU)

(73) Assignee: International Business Machines Corporation, Armonk, NY (US)

(*) Notice: Subject to any disclaimer, the term of this patent is extended or adjusted under 35 U.S.C. 154(b) by 40 days.

(21) Appl. No.: 12/948,802

(22) Filed: Nov. 18, 2010

(65) Prior Publication Data

US 2012/0131012 A1  May 24, 2012

(51) Int. Cl.
*G06F 17/30* (2006.01)
*G06Q 10/00* (2012.01)

(52) U.S. Cl.
CPC ....... *G06F 17/301* (2013.01); *G06F 17/30289* (2013.01); *G06Q 10/00* (2013.01)

(58) Field of Classification Search
CPC .......... G06F 21/50; G06F 21/00; G06F 21/54; G06F 17/30289; G06F 17/30345; G06F 17/30377
USPC ........ 707/748, 999.002–999.005; 726/22, 26
See application file for complete search history.

(56) References Cited

U.S. PATENT DOCUMENTS

| | | | |
|---|---|---|---|
| 7,587,296 B2* | 9/2009 | Harvey et al. | 702/179 |
| 7,836,502 B1* | 11/2010 | Zhao et al. | 726/22 |
| 7,991,747 B1* | 8/2011 | Upadhyay et al. | 707/674 |
| 7,996,374 B1* | 8/2011 | Jones et al. | 707/694 |
| 8,234,496 B1* | 7/2012 | Ding et al. | 713/176 |
| 2009/0012972 A1 | 1/2009 | Leitner et al. | |
| 2009/0070879 A1* | 3/2009 | Saika | 726/24 |
| 2009/0192979 A1 | 7/2009 | Lunde | |
| 2009/0205049 A1* | 8/2009 | Chakra | G06F 21/6218 726/26 |
| 2009/0254572 A1* | 10/2009 | Redlich et al. | 707/10 |

(Continued)

FOREIGN PATENT DOCUMENTS

WO  WO2006025970  3/2006

OTHER PUBLICATIONS

Kroeger et al., "The Case for Efficient Files Access Pattern Modeling", Jack Baskin School of Engineering, 1999.*

*Primary Examiner* — Monica Pyo
(74) *Attorney, Agent, or Firm* — Jeffrey S. LaBaw; David H. Judson

(57) ABSTRACT

A data loss prevention (DLP) system provides a policy-based mechanism for managing how data is discovered and classified on an endpoint workstation, file server or other device within an enterprise. The technique described herein works in an automated manner by analyzing file system activity as one or more endpoint applications interact with a file system to build a statistical model of which areas of the file system are (or will be deemed to be) active or highly active. Using this information, scanning to those areas by the DLP software is then prioritized appropriately to focus compute resources on scanning and classifying preferably only those files and folders that are necessary to be scanned, i.e., the file system portions in which the user is applying the majority of his or her activity. As a result, the technique limits scanning to only those areas that have meaningful activity (thereby conserving compute resources with respect to files or folders that have not changed), improving scanning efficiency.

24 Claims, 4 Drawing Sheets

(56) References Cited

U.S. PATENT DOCUMENTS

| | | |
|---|---|---|
| 2009/0293121 A1 | 11/2009 | Bigus et al. |
| 2010/0005471 A1* | 1/2010 | Jethani et al. ............... 718/104 |
| 2010/0115614 A1 | 5/2010 | Barile et al. |
| 2011/0246730 A1* | 10/2011 | Yoshida et al. ............... 711/156 |
| 2012/0106366 A1* | 5/2012 | Gauvin ........................ 370/252 |

* cited by examiner

METHOD AND APPARATUS FOR AUTONOMIC DISCOVERY OF SENSITIVE CONTENT

BACKGROUND OF THE INVENTION

Technical Field

This disclosure relates generally to identifying and managing user operations with respect to sensitive information (e.g., intellectual property, personally identifiable information, and the like).

Background of the Related Art

Data Loss Prevention (DLP) systems are well-known in the prior art and operate generally to identify, monitor use of, and to control user operations on, sensitive information within an enterprise computing environment. Typically, DLP systems provide a policy-based mechanism for managing how data is discovered and classified on a user's workstation or file server, also known as an "endpoint." Policies must be distributed to, and enforced on, each endpoint. In an organization comprising a large number of endpoints, the task of creating and managing policies can be onerous. This is particularly true when there are a variety of endpoint configurations, which is the situation that arises due to differing file system layouts from endpoint to endpoint based on operating system and software differences, and/or differences that result from the behaviors and actions of the end users. Creating a single policy (or even multiple such policies) that accurately and efficiently identifies which areas of the file system sensitive information tends to be discovered requires significant input from, and on-going maintenance by, system administrators.

Existing DLP systems typically provide simplistic approaches to solving the issue of how to determine which areas of an endpoint file system should be examined. One brute force approach is to simply scan the entire file system. This approach suffers from large compute resource requirements and long scan times, and it may not be feasible for file systems that contain large amounts of data. For example, a full system scan over a file server with a large amount of data will occupy system resources over a long time period. Users of that file server necessarily will be affected by any impaired performance while the scan is on-going. This problem is even more acute when the scan is carried out over the entire file system but where a large percentage of the data is not actively being accessed (and thus need not be checked).

An alternative approach is to have an administrator attempt to identify a set of known safe directories in the file system that can be then excluded from the DLP policy (and thus the scan). This approach is disadvantageous in that it often requires significant overhead for administrators in managing effectively policies. In addition, this approach naively assumes that each endpoint corresponds to the known configuration, which provides a weakness that can be easily exploited.

While these approaches are valid in some cases and can produce workable systems, they impose significant constraints on the efficiency of the DLP solution.

It is desired to provide enhanced techniques for discovery of sensitive content that addresses the above-described deficiencies.

BRIEF SUMMARY OF THE INVENTION

A data loss prevention (DLP) system provides a policy-based mechanism for managing how data is discovered and classified on an endpoint workstation, file server or other device within an enterprise. Preferably, the technique described herein works in an automated manner by analyzing compute resource access activity as one or more endpoint applications interact with the resource (e.g., a file system) to build a model (e.g., a statistical model) of which areas of the resource are (or will be deemed to be) active or highly active. Using this information, scanning to those areas by the DLP software is then prioritized appropriately to focus compute resources on scanning and classifying preferably only those files and folders that are necessary to be scanned, i.e., the file system portions in which the user is applying the majority of his or her activity. As a result, the technique limits scanning to only those areas that have meaningful activity (thereby conserving compute resources with respect to files or folders that have not changed), improving overall scanning efficiency.

In one embodiment, a method is operative at or in association with an endpoint in a DLP system. In a first step, information identifying an identity of a resource being accessed (such as a file or folder in a file system) is obtained, preferably as each resource access is carried out. A statistical model is built that identifies how frequently individual files and folders are accessed. The statistical model is continually updated based on the access information. Then, at an appropriate time (e.g., periodically, or upon initiation of a scan for sensitive content), the resources are prioritized such that a resource with a higher level of access activity is designated for scanning ahead of a resource with a lower level of access activity. Resources are prioritized according to a scoring algorithm. By prioritizing resources in this manner, scanning and content classification are more efficient, as these functions are then applied to those portions of the compute resource that have activity, as opposed to those that do not.

In an alternative embodiment, the above-described method is performed in a DLP apparatus. The apparatus comprises a processor, and computer memory that holds computer program instructions executed by the processor to carry out the method.

In another alternative embodiment, the above-described method is performed by a computer program product in a computer readable medium for use in a data processing system in association with a DLP solution. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
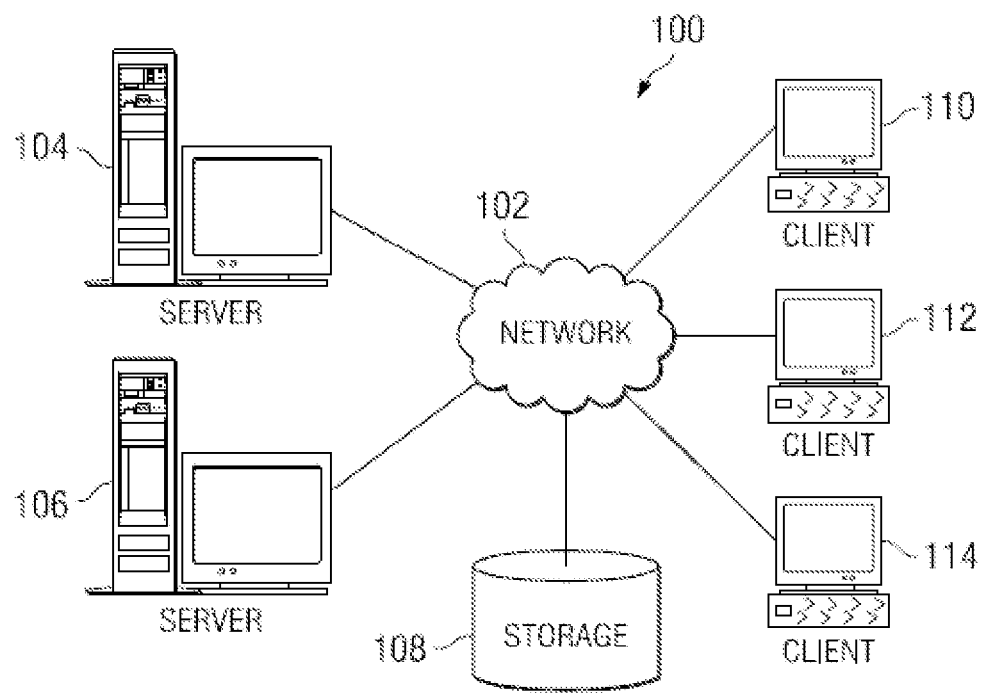
FIG. 1 depicts an exemplary block diagram of a distributed data processing environment in which exemplary aspects of the illustrative embodiments may be implemented.
Figure 2:
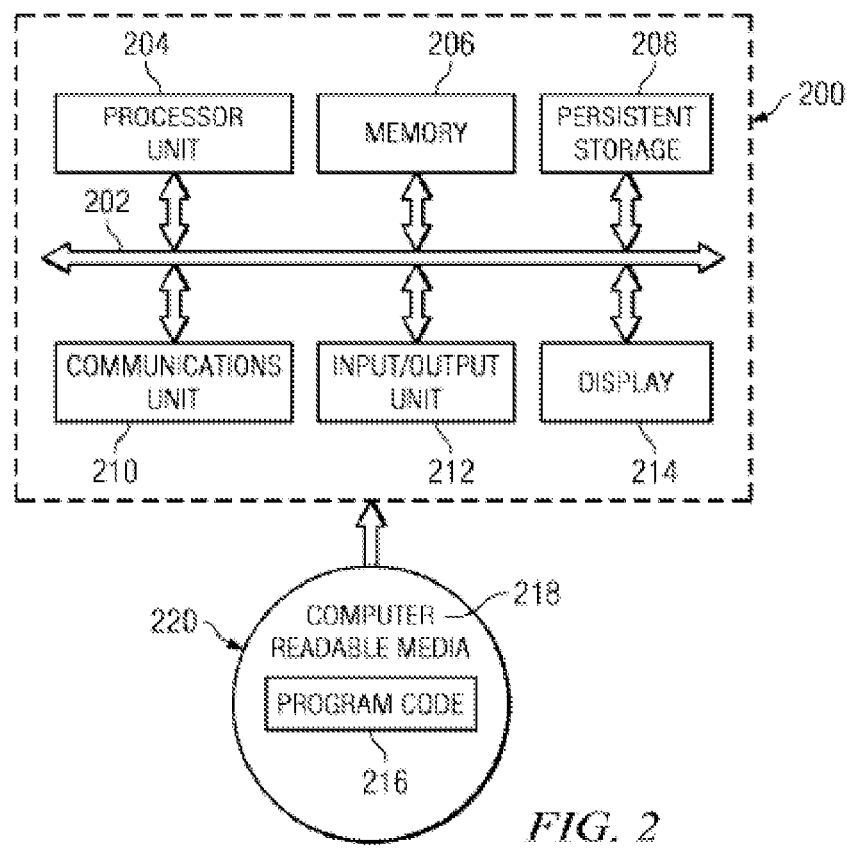
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
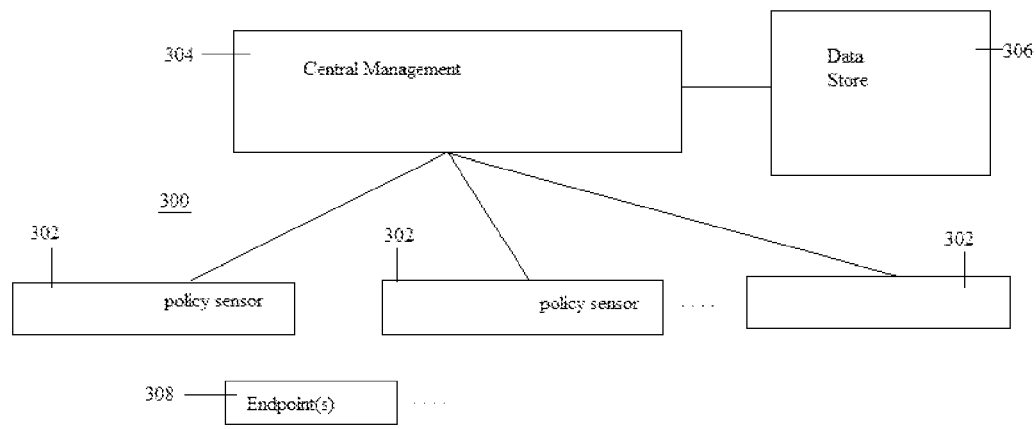
FIG. 3 illustrates a data loss prevention (DLP) solution in which the subject matter of this disclosure may be implemented.

Although not meant to be limiting, a representative data processing system in which the techniques of this disclosure are implemented is an appliance-based data loss prevention (DLP) solution. DLP systems are well-known and work to reduce the risk of sensitive data loss, primarily at the network layer. As seen in FIG. 3, a representative DLP solution 300 comprises a set of distributed components, typically arranged in a tiered architecture. Multiple policy sensors 302 are placed around the network (typically as rack-based appliances, software applications, or the like) and are designed to detect and/or prevent data loss. Generally, in an appliance-based implementation, an appliance may comprise a data processing system such as described in FIG. 2. The appliance includes a policy engine that works generally by capturing packets from the network, reassembling the packets into sessions, analyzing the information flow, extracting content for analysis, and performing content analysis to identify sensitive information. The appliance may use system-defined or user-defined policies, where a policy represents a group of one or more rules. A rule typically is a logical combination of one or more triggers that are content-based, location-based and/or flow-based. Sessions with policy violations are detected by the sensors and forwarded a central management console 304 that distributes policies and collects and organizes alerts. A data store 306 is used to store data and policies, typically in a database. The central management console 304 includes a web-based graphical user interface (GUI) for management, administration and reporting. As used herein, the type of sensitive information protected by such a DLP solution may be quite varied. Typically, such information includes, without limitation, intellectual property (e.g., code, designs, documentation, other proprietary information), identity information (e.g., personally identifiable information (PII), credit card information such as PCI-related data), health care information such as HIPAA-related data, finance information such as GLBA-related data, and the like.

As also seen in FIG. 3, and as will be described in more detail below according to the teachings herein, portions of the DLP solution are implemented across one or more endpoints 308.

DLP functionality may also be built into other enterprise systems, such as an intrusion detection system (IDS), an intrusion protection system (IPS), or the like. Thus, for example, an IPS can monitor and detect attack traffic, and DLP support can be added to perform outbound DLP protection and associated blocking of the transfer of sensitive content.

Thus, in general a DLP system in which the subject matter herein is implemented provides a policy-based mechanism for managing how data is discovered and classified on an endpoint workstation, file server or other device within an enterprise. According to the subject matter of this disclosure, which is now described, an endpoint with an enterprise (including, without limitation, a user machine, a file server, or some other defined computing entity) includes DLP (or equivalent) software that is extended with the capability to identify key high risk areas for classification of sensitive files associated with the endpoint. As used herein, in general an endpoint is a data processing system (such as described above in FIG. 2) and that has an associated file system (or equivalent data store). The file system may or may not be part of the endpoint. The endpoint executes DLP software. One or more applications executing on the endpoint interact with the associated file system, e.g., by reading data from files, and by writing data to files, in the usual manner. Other file management operations may be implemented as well. Generally, the technique described herein works by analyzing file system activity as those endpoint applications interact with the file system to build a statistical model of which areas of the file system are (or will be deemed to be) active or highly active. Using this information, scanning to those areas by the DLP software is then prioritized appropriately to focus compute resources on scanning and classifying only those files and folders that are necessary to be scanned, i.e., the file system portions in which the user is applying the majority of his or her activity. As a result, the technique limits scanning to only those areas that have meaningful activity (thereby conserving compute resources with respect to files or folders that have not changed), it enables an increase in the frequency to which routine scanning is applied (which results in enhanced accuracy of the DLP system), and it enables better scheduling of time frame(s) during which scanning is performed yet still ensuring that important files and folders are scanned.

Figure 4:
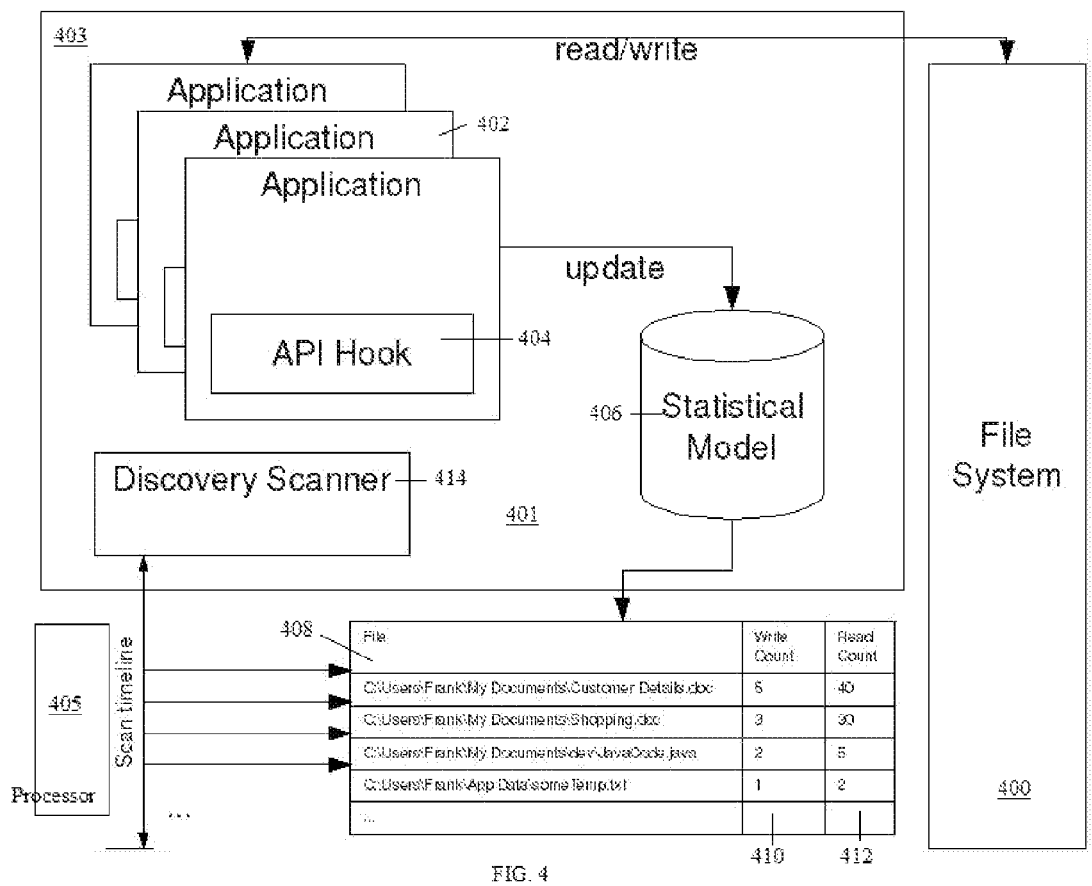
FIG. 4 is an embodiment of the disclosed subject matter as implemented within an endpoint machine.

Referring now to FIG. 4, an embodiment of the inventive technique as implemented in an endpoint (or equivalent) is disclosed. As noted, a representative endpoint is a data processing system such as shown in FIG. 2. It includes a DLP application 401 that executes as software, i.e., as a set of program instructions, executed from computer memory 403 by a processor 405. The DLP application is configurable according to a policy, where the policy is created and managed in a central management console (such as shown in FIG. 3). This is not a limitation, however, as a particular DLP policy may be implemented locally (at the endpoint itself). As noted above, the endpoint includes or has associated therewith a conventional file system 400 in which data are organized in folders (directories) and files in a well-known manner. One or more applications 402 interact with the file system 400 in a variety of known ways, e.g., by reading data from the file system, by writing data to the file system, or the like. According to this disclosure, a DLP solution is enhanced by instrumenting one or more applications 402 with application programming interface (API) hook code 404, which code operates to intercept system API calls and examine those calls for file open and file write calls. The API hook code 404 executing in each application 402 updates a statistical model 406 that is maintained in endpoint memory (or on an associated disk store). The statistical model 406 captures how frequently individual files and folders are accessed by the applications that are instrumented with the hook code. In particular, and as illustrated, the statistical model 406 builds up a data representation 408 of files and folders associated with the type of access, along with a counter that represents the number of accesses (read or write), preferably since a scan was last performed on the file. A portion of the representation 408 is shown for several identified files, together with their associated write count 410 and read count 412. The table may be maintained in any convenient manner, e.g., as a set of relational tables, as a linked list, as a data array, or the like. The DLP solution also includes a discovery scanner 414, which preferably is implemented in software (a set of program instructions executed by a processor). Advantageously, the discovery scanner 414 prioritizes its scanning resources on those files and folders where there is a high level of activity (as evidenced by the data collected in the statistical model).

Figure 5:
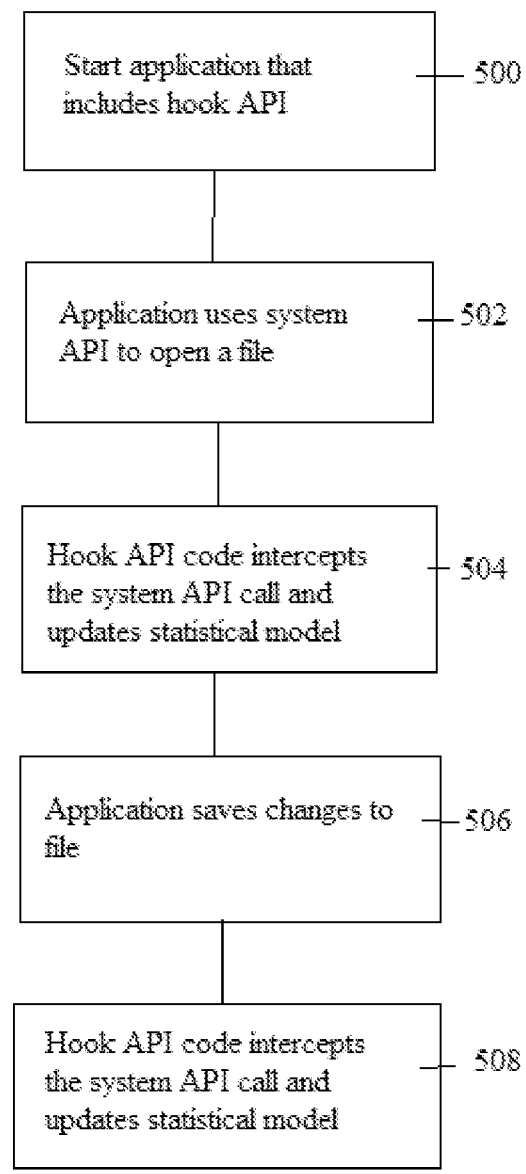
FIG. 5 is a process flow diagram illustrating how the API hook code operates to collect access data and to build a statistical model.

In particular, and with reference now to the process flow in FIG. 5, an example use case is described. An application (e.g., Open Office) executing on the endpoint has been provisioned in the manner described, namely, to include the API hook code. The process begins at step 500 when the application starts. At step 502, the application uses a system API to open a file (such as a document) on disk. At step 504, the API hook code intercepts the system API call and executes code to update the statistical model with the read event. At step 506, the user has interacted with the document and saves his or her changes. This generates a write event. At step 508, the API hook code intercepts the system API call, and updates the statistical model to record the write event. In a similar manner, the API hook code executing on each application provides similar data, and the statistical model is built up accordingly.

Although not meant to be limiting, the hook code works generally as follows. The code includes a dynamic link library (DLL) or equivalent code that replaces a target function to be intercepted (here, the system API calls to read or write). In operation, the hook code intercepts the function call and injects the DLL to the target process. Upon attaching to the target process, the DLL hooks itself to the target function.

Alternative approaches to capturing data to build the statistical model may be implemented as well. Thus, for example, if the file system already logs access and modification data, it may be extended to include a counter of access. That data can then be fetched by the discovery scanner, as is described below. Another approach is for the file system to perform an analysis over an entire file to identify where file access and modification times have changes since a prior pass, and then recording that data in the statistical model. Any other technique for capturing file and/or folder access (or, more generally, file system access or use) information may be used as well.

The statistical model may be maintained for file system access activity for one more applications associated with an endpoint, or for one or more endpoints. Likewise, a particular DLP scan policy may be applied to a given endpoint, or across one or more endpoints.

Figure 6:
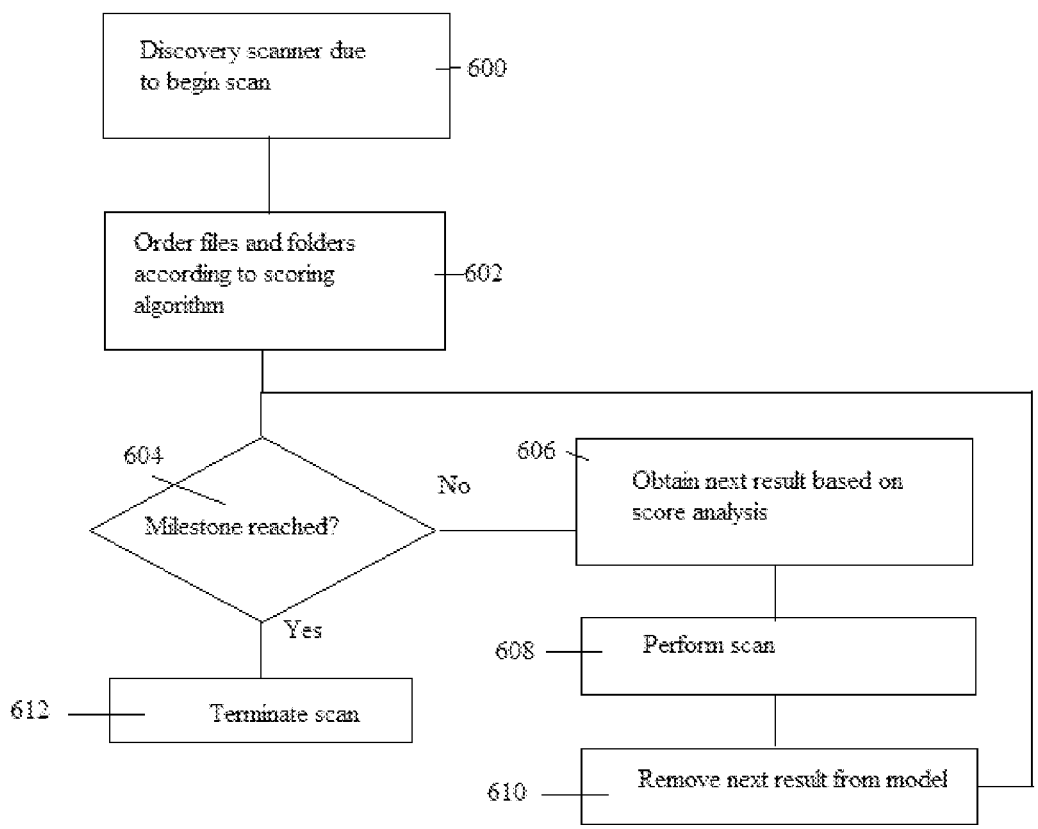
FIG. 6 is a process flow diagram illustrating an operation of a discovery scanner that prioritizes files for scanning according to the subject matter described herein.

FIG. 6 is a process flow illustrating the operation of a discovery scanner in a representative embodiment. The process begins at step 600 when the discovery scanner is due to perform a scan. The timing of the scan typically is established by a policy. At this step, the discovery scanner opens (or otherwise obtains access to) the statistical model. At step 602, the discovery scanner orders the files and folders using an algorithm as described below. In general, the algorithm orders the files and folders according to which have exhibited the highest degree of activity since the last scan. At step 604, the discovery scanner tests to determine whether a scanning milestone has been reached. If not, the routine continues at step 606 to obtain a next result from the statistical model. In the first iteration, the next result is the result with the highest score or value as determined by the ordering step 602. At step 608, the discovery scanner begins its scan with the next result. At this step, the discovery scanner scans the files and folders identified by the next result. At step 610, after the scan is complete, the next result is removed from the statistical model. Control then returns back to step 604, and the process repeats for a next result, and so on, until the scanning milestone has been reached. At this point, the routine branches to step 612 and the discovery scanner terminates its operation for this particular scan.

The completion milestone is configurable according to policy and may be one or more of the following. A scan may continue until all files from the statistical model have been processed. The scan may continue for an allocated time period (e.g., one hour per day/week). The scan may cover only a predetermined number of files (e.g., limit of 500 per day/week). The scan may cover only files whose access count exceeds a predetermined value (e.g., only files with over 10 accesses). Of course, the above examples are merely illustrative, as any completion milestone may be implemented depending on compute resources and their availability. Using a policy manager, an administrator can configure the completion milestone to control the impact DLP has on the end user in terms of occupying resources on their endpoint.

Thus, according to the technique described herein, resources are prioritized for scanning (to search for sensitive content) based on the statistical model. In general, a resource with a higher level of access activity (as evidenced by the model) is designated for scanning ahead of a resource with a lower level of access activity. Preferably, resource scanning priorities are based on a scoring algorithm that uses the resource access count data accumulated in the model. One or more weights may be applied to a resource access count. Calculating a score for a given resource may be as simple as a function [WriteCount+ReadCount]. A more sophisticated approach can be utilized to guard against false positives and negatives, for example, by applying one or more weights against one or both of the WriteCount and ReadCount fields, and/or considering the classification history of the resource (e.g., whether the resource has been previously classified as sensitive). Thus, in one non-limiting embodiment, the following scoring algorithm may be used:

If resource has no prior classification score=Weight1*ReadCount+Weight2*WriteCount Else If resource classified sensitive
If WriteCount=0
score=0 (ie not important to scan)
Else score=Weight3*ReadCount+Weight4*WriteCount Else (resource classified not sensitive)
If WriteCount=0
score=0 (ie not important to scan)
Else score=Weight5*ReadCount+Weight6*WriteCount The algorithm set forth in the pseudo-code first determines whether classification of the file (in terms of its content sensitivity) has been attempted previously by the DLP solution. If not, then the algorithm sets the score equal to a function [(weight1*Read Count)+(weight2*Write Count)]. The next result is then obtained using these values. If, in this embodiment, the file has been classified in terms of sensitivity, the algorithm determines if the file has been classified as sensitive. If so, and if Write Count is 0, the score is set equal to 0 (meaning the file is not important to scan); otherwise, the score is set equal to a function [(weight3*Read Count)+(weight4*Write Count)]. If, however, the file has been classified in terms of sensitivity but classified as not sensitive, the algorithm continues as follows. If Write Count is 0, the score is once again set equal to 0; otherwise, the score is set equal to a function [(weight5*Read Count)+(weight6*Write Count)]. This approach enables the weights 1, 2, 5 and 6 to be set appropriately to ameliorate risk associated with false negatives, while weights 3 and 4 can be set appropriately to guard against risk of false positives.

The usefulness of the weighted approach to scoring can be seen by example. Suppose there are two files, both of which have been scanned; one file has been determined to be sensitive while the other has been determined to be non-sensitive. It is further assumed that both files have seen the same amount of user activity (e.g., 1 write and 5 reads) since a last discovery scan. Without a weighted scoring algorithm, both files would have a same score value; thus, the resulting scan order would be non-deterministic. Now, assume (as a matter of policy) that a business decides that the impact from files remaining classified as sensitive after having had sensitive data removed is more detrimental than the impact from having files remain unclassified after they have had sensitive data added to them. In this example scenario, a user can set weighting 3 and/or 4 to a higher value than weighting 5 and 6. So, if weighting 3 is set to a value (e.g., 10) and weightings 4, 5 and 6 are set to another value (e.g., 1), then the score for the file classified as sensitive is now 15 while the score for the file classified as non-sensitive is now 6. As a consequence, the sensitive classified file is scanned ahead of the non-sensitive classified file, fulfilling the business objective.

Thus, by having separate weightings for reading and writing, values can be tuned (e.g., manually or programmatically) to reflect risk. As another example, while a business may consider the detrimental impact of false positives to be greater than that of false negatives, it may also believe that false negatives are more detrimental the more widely they are spread. To reflect this risk profile, the user may increase the value of weighting 6 (e.g., from 1 to 2). As a consequence, at a certain number of read accesses, the false negative has a higher score than the false positive (assuming the number of write accesses are constant).

Of course, the above examples should not be taken to limit the invention. Any suitable scoring algorithm may be used, such as merely selecting the highest value of the ReadCount, or the highest value of the Write Count, or the like. Moreover, where weights are used in the scoring algorithm, any appropriate weighting scheme may be used to adjust risk deemed appropriate to meet a business objective.

The above-described technique prioritizes scanning to those files and folders which exhibit a high level of access activity (as captured by the statistical model). By prioritizing which files and folders (or more generally, which portions of the file system) are to be scanned based on the file access information, the technique reduces the scanning time and overhead, thereby improving the performance of the DLP content classification. Using the described approach, a much more targeted scanning strategy is developed and implemented, effectively targeting those files or folders that have the highest amount of activity. Preferably, the file system activity information is captured independently for each application (or a set of applications) on the endpoint to create the statistical model. By providing a prioritized list of files or folders to scan, the described technique enables the DLP system to restrict discovery and classification to known high priority files, e.g., based on count limit, time windows, or other criteria, associated with a given schedule.

The subject matter described herein has many advantages. As described, the subject matter provides for an automated approach to identify key high risk areas for classification of sensitive files in a system, such as a DLP system. The above-described algorithm utilizes file system metrics to focus compute resources on scanning and classifying only those files (or, more generally, file system portions) in which a user is applying the majority (or some other given percentage) of his or her activity. This provides for more efficient use of compute resources, it minimizes those areas of the file system requiring a scan (resulting in reduced scan time), provides an opportunity and ability to limit scanning based on configurable time windows while still capturing key files effectively, increases classification accuracy on files, especially those that undergo frequent modification, requires no training or on-going administration or policy management, and is autonomic.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the DLP functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the hook code and discovery scanner components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing DLP solution.

The described functionality may be implemented as an adjunct or extension to an existing DLP solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The techniques disclosed herein are not limited to a middleware DLP appliance that monitors network traffic such as has been described, but this will be a typical implementation. As noted, the above-described analysis and scanning function may be used in any system, device, portal, site, or the like wherein it is desired to analyze data for inclusion of sensitive information.

Moreover, although the technique for building the statistical model has been described within the context of file system access, this is not a limitation either. The statistical model may be built on other compute resource attributes, such as availability, load, latency, network distance, or other attributes. The compute resource from which the statistical model is built may be any system(s), device(s), program(s) or process(es).

Having described our invention, what we now claim is as follows.

The invention claimed is:

1. A method, operative at or in association with an endpoint in a data loss prevention (DLP) system, the DLP system executing at least in part on hardware and operative to perform scans of resources in a file system associated with the endpoint to search for sensitive content, the scans including an ordered set of scans that include a last scan followed by a next scan, comprising:
following the last scan:
obtaining information identifying an identity of a resource being accessed; and
updating a statistical model of resource access and usage based on the obtained information, the statistical model including, with respect to a resource, a count of resource accesses since the last scan; and
prior to initiating the next scan, prioritizing resources for further scanning for sensitive content based at least in part on resource access counts in the statistical model and one or more content sensitivity classifications associated with one or more resources.

2. The method as described in claim 1 wherein prioritizing is based on a scoring algorithm.

3. The method as described in claim 2 wherein the scoring algorithm applies at least one weight to a resource access count.

4. The method as described in claim 3, wherein the particular resource access count includes a read count, and a write count.

5. The method as described in claim 4, wherein the scoring algorithm applies one or more weights against one of: the read count, and the write count.

6. The method as described in claim 5, wherein, with respect to given resource, the scoring algorithm applies separate weightings to the read count and the write count.

7. The method as described in claim 1 wherein the resource being accessed is a file or folder of a file system.

8. The method as described in claim 1 further including conducting the next scan of the resources, in order of access activity as indicated in the statistical model, until a completion milestone is reached.

9. The method as described in claim 8 wherein the completion milestone is one of: scanning of all resources represented in the statistical model, completion of an allocated time period, completion of a scan of a predetermined number of resources, and completion of a scan of resources having an access count that exceeds a threshold.

10. The method as described in claim 1 wherein the information is obtained by intercepting a system application programming interface (API) call.

11. An apparatus, operative at or in association with an endpoint in a data loss prevention (DLP) system, the DLP system operative to perform scans of resources in a file system associated with the endpoint to search for sensitive content, the scans including an ordered set of scans that include a last scan followed by a next scan, comprising:
a processor;
computer memory holding computer program instructions executed by the processor and operative:
following the last scan:
to obtain information identifying an identity of a resource being accessed; and
to update a statistical model of resource access and usage based on the obtained information, the statistical model including, with respect to a resource, a count of resource accesses since the last scan; and
prior to initiating the next scan, to prioritize resources for further scanning for sensitive content based at least in part on resource access counts in the statistical model and one or more content sensitivity classifications associated with one or more resources.

12. The apparatus as described in claim 11 wherein prioritizing is based on a scoring algorithm.

13. The apparatus as described in claim 12 wherein the scoring algorithm applies at least one weight to a resource access count.

14. The apparatus as described in claim 11 wherein the resource being accessed is a file or folder of a file system.

15. The apparatus as described in claim 11 wherein the computer program instructions are further operative to conduct the next scan of the resources, in order of access activity as indicated in the statistical model, until a completion milestone is reached.

16. The apparatus as described in claim 15 wherein the completion milestone is one of: scanning of all resources represented in the statistical model, completion of an allocated time period, completion of a scan of a predetermined number of resources, and completion of a scan of resources having an access count that exceeds a threshold.

17. The apparatus as described in claim 11 wherein the information is obtained by intercepting a system application programming interface (API) call.

18. A non-transitory computer readable storage medium comprising a computer program product for use in a data processing system operative at or in association with an endpoint in a data loss prevention (DLP) system, the DLP system operative to perform scans of resources in a file system associated with the endpoint to search for sensitive content, the scans including an ordered set of scans that include a last scan followed by a next scan, the computer program product holding computer program instructions which, when executed by the data processing system, perform a method comprising:
following the last scan:
obtaining information identifying an identity of a resource being accessed; and
updating a statistical model of resource access and usage based on the obtained information, the statistical model including, with respect to a resource, a count of resource accesses since the last scan; and
prior to initiating the next scan, prioritizing resources for further scanning for sensitive content based at least in part on resource access counts in the statistical model and one or more content sensitivity classifications associated with one or more resources.

19. The non-transitory computer readable storage medium as described in claim 18 wherein prioritizing is based on a scoring algorithm.

20. The non-transitory computer readable storage medium as described in claim 19 wherein the scoring algorithm applies at least one weight to a resource access count.

21. The non-transitory computer readable storage medium as described in claim 18 wherein the resource being accessed is a file or folder of a file system.

22. The non-transitory computer readable storage medium as described in claim 18 wherein the method further includes conducting the next scan of the resources, in order of access activity as indicated in the statistical model, until a completion milestone is reached.

23. The non-transitory computer readable storage medium as described in claim 22 wherein the completion milestone is one of: scanning of all resources represented in the statistical model, completion of an allocated time period, completion of a scan of a predetermined number of resources, and completion of a scan of resources having an access count that exceeds a threshold.

24. The non-transitory computer readable storage medium as described in claim 18 wherein the information is obtained by intercepting a system application programming interface (API) call.

* * * * *